(12) United States Patent
Naik et al.

(10) Patent No.: US 8,041,126 B1
(45) Date of Patent: Oct. 18, 2011

(54) INTELLIGENT DOCUMENT SCANNING

(75) Inventors: Devang K. Naik, San Jose, CA (US); Kim E. A. Silverman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1212 days.

(21) Appl. No.: 10/946,194

(22) Filed: Sep. 21, 2004

(51) Int. Cl.
    *G06K 9/34* (2006.01)
    *G06K 9/72* (2006.01)
    *G06F 17/20* (2006.01)

(52) U.S. Cl. .............................. 382/229; 382/180; 704/1

(58) Field of Classification Search .................. 382/229, 382/180; 704/1
See application file for complete search history.

(56) References Cited

U.S. PATENT DOCUMENTS

| | | | | |
|---|---|---|---|---|
| 5,848,191 | A | * | 12/1998 | Chen et al. .................... 382/229 |
| 7,370,034 | B2 | * | 5/2008 | Franciosa et al. ................. 707/3 |
| 2003/0028604 | A1 | * | 2/2003 | Aktas et al. .................... 709/206 |
| 2003/0214681 | A1 | * | 11/2003 | Bohan ............................ 358/468 |
| 2005/0174613 | A1 | * | 8/2005 | Tan ................................ 358/486 |

OTHER PUBLICATIONS

Jing, H.—"Sentence Reduction for Automatic Text Summarization"—Proceedings of the sixth conference on Applied natural language processing—2000, pp. 310-315.*

ANLP 2000, 6th Applied Natural Language Processing Conference, Apr. 29-May 4, Seatle, Washington, USA http://www.informatik.uni-trier.de/~ley/db/conf/anlp/anlp2000.html.*

Gong, Y.—"Generic text summarization using relevance measure and latent semantic analysis"—SIGIR 2001, pp. 19-25.*

Chali, Y.—"Query-biased text summarization as a question-answering technique"—AAAI Technical Report—1999, pp. 52-56.*

Chali, Y.—"Generic and query-based text summarization using lexical cohesion"—AI 2002, pp. 293-302.*

Jing, H.—"Summary generation through intelligent cutting and pasting of the input document"—Ph.D. Thesis, Jan. 30, 1999, pp. 1-40.*

Cardie, C.—"Examining the role of statistical and linguistic knowledge sources in a general-knowledge question-answering system"—ANLP—2000, pp. 180-187.*

* cited by examiner

*Primary Examiner* — Bhavesh Mehta
*Assistant Examiner* — Bernard Krasnic
(74) *Attorney, Agent, or Firm* — William, Morgan & Amerson, P.C.

(57) ABSTRACT

A method, apparatus, and system, for scanning a first portion of a data to generate a second portion of data is provided. A control parameter relating to a level of detail associated with filtering a first portion of data is received. The filtering of the first portion of data is performed based upon the control parameter. The filtering of the first portion of data includes a rule-based filtering, a context-based filtering, a statistical-based filtering, or a semantic-based filtering. Performing the filtering provides for a reduction of a portion of the first portion of data. A second portion of data that is smaller than the first portion of data is provided based upon the filtering of the first portion of data.

50 Claims, 5 Drawing Sheets

INTELLIGENT DOCUMENT SCANNING

BACKGROUND OF THE INVENTION

1. Field of the Invention

This invention relates generally to screening an image, and, more particularly, to a method, apparatus and system for performing an intelligent scanning of an image.

2. Description of the Related Art

Many developments have been introduced in the arena of deciphering data, including text data, from various sources, such as computer screens, books, newspapers, personal data assistants (PDAs) and the like. Various scanning hardware and software/have been offered to scan text from various media. There are several reasons to employ scanning devices that scan text or other data. For example, remote access to text may be received through scanning devices. A person who is researching in a library may find it beneficial to scan an image, text, graphics, or a combination thereof, to perform efficient research. Other important uses include enabling those with various disabilities to access information from newspapers, computer screens, books, etc. One major use of scanning devices includes scanning of text for display as audio files for those with vision impairments.

Current scanning devices, such as computer screen readers, allow a person to skip various portions of an image for the purposes of scanning or perusing through a particular block of text to determine whether a closer examination of the text would be desirable. It is often desirable to skim through various blocks of text to more efficiently decipher the content of the block of text. Various screen readers generally enable a person to skip paragraphs, skip lines, or perform word level skipping, such that a person with vision impairment may skip various portions of the text before deciding whether to delve more deeply into the content of the text. Therefore, using state-of-the-art readers, a person can skip a predetermined block of text (e.g., a paragraph, a line, a page, etc.), while examining some portions in an attempt to decipher a general concept of the text. However, a person may inadvertently miss several key concepts relating to a particular document by skipping various blocks of text. This could prove to be an inefficient method of scanning through vast amounts of data to determine if a closer examination of the content of the data would be desirable. This problem would also apply to a person performing research in a library. A person sifting through large amounts of text would benefit from an efficient method of deciphering the major contents of a block of text without have to read all of the available material in the library. This person may desire a brief synopsis of the content of a block of text before deciding to delve deeper.

One problem associated with state-of-the-art implementation of scanning devices, such as screen readers, includes the fact that they generally skip blocks of text as predetermined by a user. This presents a problem since some text may be heavily formatted, such as web displays on the World Wide Web or other Internet or Intranet sources, or various library resources. Often, simply skipping blocks of text or data may not provide an efficient synopsis of a particular block of text. Therefore, it could become cumbersome and inefficient for a person with vision impairment to decipher or decide whether to examine a particular text more closely, based upon the scanning provided of the text. Sometimes the point of interest of a particular set of data or text may get lost in the implementation of state-of-the-art scanning/reading devices. Without resorting to ad hoc skipping of predetermined blocks of text, the reader may desire to peruse all of the text that could affect productivity. Also, as mentioned above, scanners that may be employed in libraries to assist a person conduct a major research project who may require quick synopses of a large portion of text that may be heavily formatted, can be cumbersome and inefficient. State-of-the-art scanners may not provide an accurate or efficient understanding of the text being scanned, therefore, reducing the efficiency in research.

The present invention is directed to overcoming or at least reducing one or more of the problems set forth above.

SUMMARY OF THE INVENTION

In one aspect of the present invention, a method is provided for scanning a first portion of a data to generate a second portion of data. A control parameter relating to a level of detail associated with filtering a first portion of data is received. The filtering of the first portion of data is performed based upon the control parameter. The filtering of the first portion of data includes a rule-based filtering, a context-based filtering, a statistical-based filtering, or a semantic-based filtering. Performing the filtering provides for a reduction of a portion of the first portion of data. A second portion of data that is smaller than the first portion of data is provided based upon the filtering of the first portion of data.

In another aspect of the present invention, a method is provided for scanning a first portion of data to generate a second portion of data. A first portion of data is received based upon scanning data. The filtering of the first portion of data is performed based upon the control parameter. The filtering of the first portion of data includes a rule-based filtering, a context-based filtering, a statistical-based filtering, or a semantic-based filtering. Performing the filtering provides for a reduction of a portion of the first portion of data. A second portion of data that is smaller than the first portion of data is provided based upon the filtering of the first portion of data.

In another aspect of the present invention, a system is provided for scanning a first portion of data to generate a second portion of data. The system of the present invention includes a data source for providing text and a scanning device to scan said text and perform a filtering function upon said scanned text. The filtering function includes performing a rule-based filtering, a context-based filtering, a statistical-based filtering, or a semantic-based filtering in order to perform a reduction of at least a portion of said first portion of data to produce a second portion of text that is smaller than said first portion. The system also includes a data output source to present said second portion of text.

In yet another aspect of the present invention an apparatus is provided for scanning a first portion of data to generate a second portion of data. The apparatus of the present invention includes a scanning device to scan a first portion of text to provide scanned text and to perform a filtering function upon said scanned text. The filtering function includes performing a rule-based filtering, a context-based filtering, a statistical-based filtering, or a semantic-based filtering to perform a reduction of at least a portion of said first portion of data to produce a second portion of text that is smaller than said first portion of text.

In still yet another aspect of the present invention, a computer readable program storage device encoded with instructions is provided for scanning a first portion of data to generate a second portion of data. The computer readable program storage device encoded with instructions that, when executed by a computer, performs a method, which includes receiving a control parameter relating to a level of detail associated with filtering a first portion of data. The method also includes performing said filtering of said first portion of data based upon said control parameter. The filtering of said first portion of data includes a rule-based filtering, a context-based filtering, a statistical-based filtering, or a semantic-based filtering to perform a reduction of at least a portion of said first portion of data. The method also includes providing a second portion of data that is smaller than said first portion of data based upon said filtering of said first portion of data.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide performing an active scanning of a portion of data, such as text data, based upon various techniques. "Data" may include various types of information, such as test data, graphical data, audio data, video data, and/or the like. Utilizing embodiments of the present invention, rather than merely skipping a predetermined amount of text, a more intelligent algorithm for data skimming may be employed. Embodiments of the present invention provide various types of filtering to scan a set of data, such as a block of text, and decipher a more meaningful synopsis of the text. Various techniques may be used to implement the intelligent algorithms provided by the present invention. The intelligent algorithms provided by the present invention may include a context based filter, a statistical based filter, a semantic based filter, and/or a rule based filter to filter a scanned portion of data. For example, a person with vision impairment may be able to more efficiently scan or peruse for the main point of a particular block of text and then determine whether to investigate the text further or skip that particular block of text. This may include skimming, which includes skipping a number of characters or words to obtain the main point, through a block of text to efficiently evaluate the content of the block of text. Also, for example, in performing library research, a person who is tasked with reviewing a large amount of text may scan various portions of the text to achieve a general understanding before spending additional time examining the particular block of text more closely. Embodiments of the present invention provide for more efficient skimming of information content without substantial loss of concept or semantics relating to the content.

Figure 1:
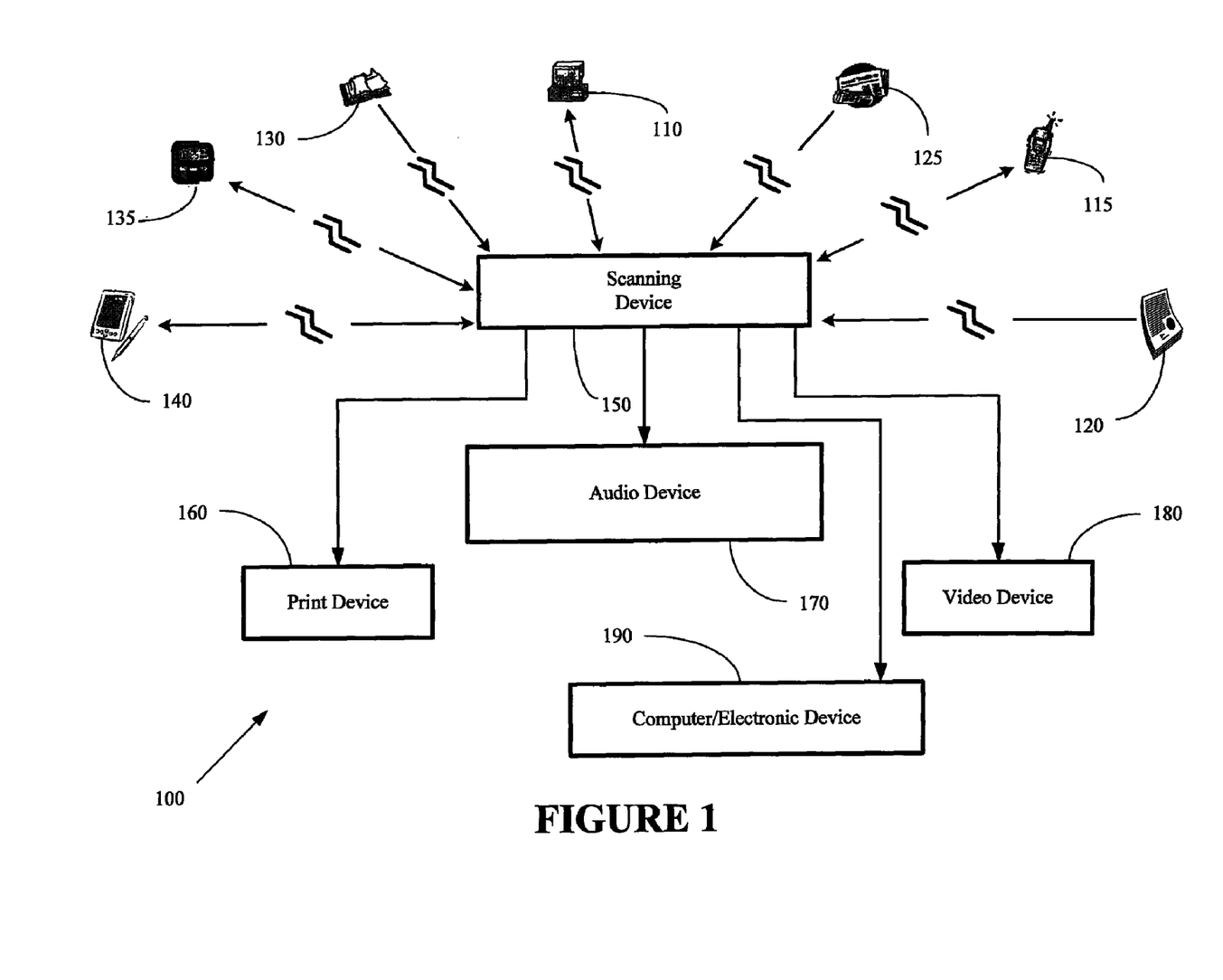
FIG. 1 illustrates a stylized depiction of a scanning system, in accordance with one illustrative embodiment of the present invention.

Turning now to FIG. 1, a system in accordance with embodiments of the present invention is provided. The system 100 in FIG. 1 illustrates a scanning device 150 that may receive data, such as text data, from one or more sources. For example, the system 100 may provide the scanning device 150 data from a computer system 110, a cellular or wireless phone 115, a simple text document 120, a newspaper 125, a book 130, a personal communication device (e.g., pager, text messenger, such as one offered by Blackberry) 135, and/or a personal data assistant (PDA) 140, and the like. The scanning device 150 may take on a variety of configurations and may comprise various parts that are capable of scanning data from the various sources described above. FIG. 1 also illustrates a print device 160 that may receive an output from the scanning device 150 and print an abbreviated version of the data that is scanned by the scanning device 150. The print device 160 may be of a variety of printing devices, such as printers, fax machines, and the like.

The system 100 may also comprise a video device 180 that is capable of displaying the scanned, abbreviated version of the data provided by the scanning device 150. The video device 180 may be a computer monitor, a television, an LCD screen, an LED screen, and/or the like. The scanning device 150 may also provide an output of an abbreviated version of the scanned data to a computer/electronic device 190, such as a desktop computer, a laptop computer, a PDA 140, and the like. Additionally, the scanning device 150 may provide an abbreviated version of the scanned data to an audio device 170. The audio device 170 may comprise various portions, such as a controller, software, and a speaker system to present the scanned, abbreviated data or text in an audio format, which may be particularly helpful for persons with vision impairment.

Figure 2:
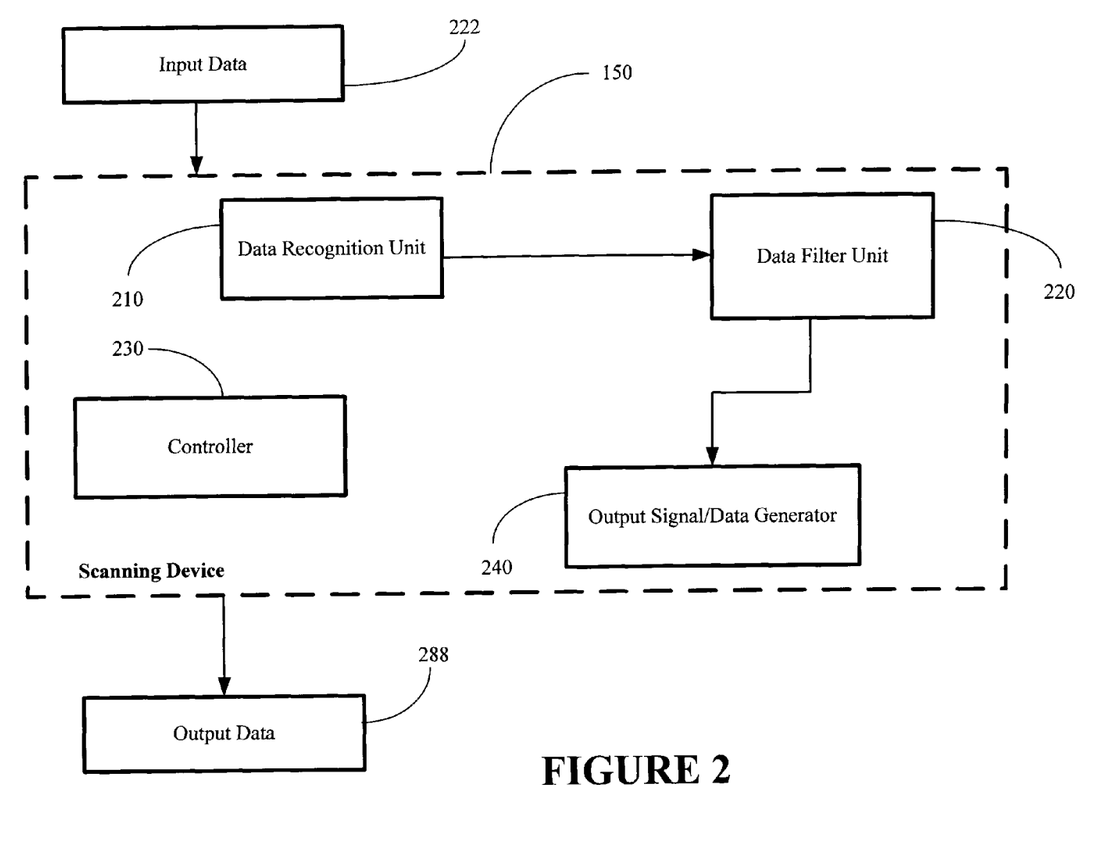
FIG. 2 illustrates a block diagram representation of a scanning device of the system of FIG. 1, in accordance with one illustrative embodiment of the present invention.

Turning now to FIG. 2, a more detailed block diagram representation of the scanning device 150 in accordance with embodiments of the present invention is illustrated. The scanning device 150 receives an input data 222 from one of the various data sources described in FIG. 1. The scanning device 150 then performs a filtering associated with the scanning provided by embodiments of the present invention in order to provide an abbreviated version of the data as output data 288. The scanning device 150 may comprise a controller 230 for controlling the receiving and the generating of processed data. The controller 230 may comprise software, hardware, and/or firmware components to control various operations performed by the scanning device 150.

The scanning device 150 comprises a data recognition unit 210, a data filter unit 220, and an output signal/data generator 240. The data recognition unit 210 performs a recognition function to receive the content of the input data 222. The data recognition unit 210 may be a scanning device to scan text from a variety of sources. The data recognition unit 210 may be a software, firmware, or hardware unit that is capable of receiving or deciphering data from a computer system or a device that can decipher data from a computer monitor.

Upon performing the data recognition function, the recognized data is sent to the data filter unit 220, which performs a filtration of the data to provide an abbreviated synopsis of the content of the input data 222. The data filter unit 220 is capable of performing various types of data filtering to decipher and/or filter the input data 222 to provide a more abbreviated type of data. A more detailed description of the data filter unit 220 is provided in FIG. 3 and accompanying description below. Once the data is filtered to provide an abbreviated version of the input data 222, the output signal/data generator 240 generates the output signal that is sent to various devices, such as the print, audio, or video devices 160, 170, 180 described in FIG. 1. The output signal/data generator 240 may provide visual data, audio data, and the like.

The scanning device 150 may be capable of extracting and presenting text from a computer screen that may contain various portions of text and graphics. Furthermore, in one embodiment, the scanning device 150 may be controlled by voice activation.

Figure 3:
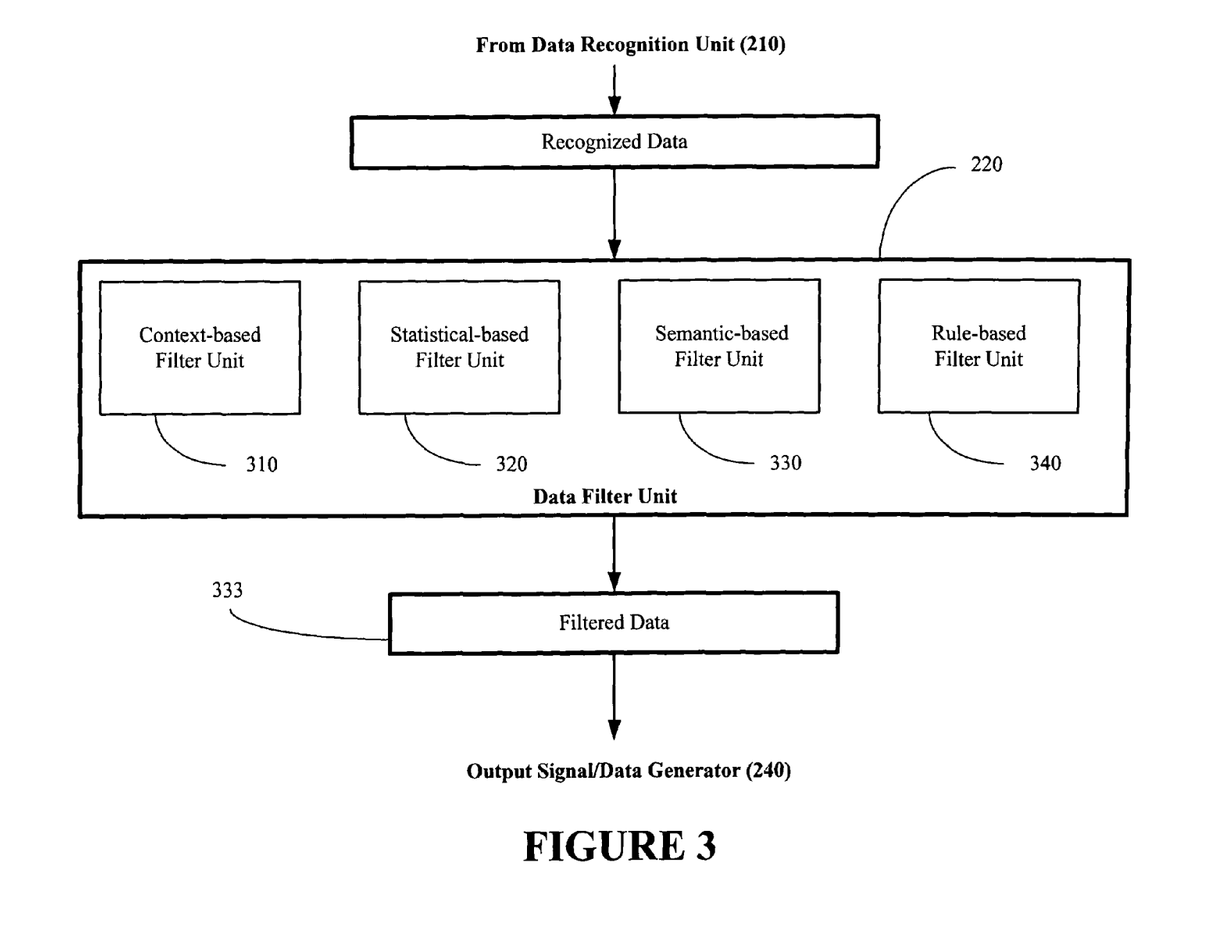
FIG. 3 illustrates a block diagram representation of a data filter unit of FIG. 2, in accordance with one illustrative embodiment of the present invention.

Turning now to FIG. 3, a more detailed depiction of the data filter unit 220 is illustrated. In one embodiment, the recognized data from the data recognition unit 210 is provided to the data filter unit 220, which then provides filtered data 333 that is sent to the output signal/data generator 240. The data filter unit 220 may comprise various filters, such as a context-based filter unit 310, a statistical-based filter unit 320, a semantic-based filter unit 330, and/or a rule-based filter unit 340. The context-based filter unit 310 is capable of scanning through a predetermined amount of data, such as text data, and filtering a number of words based upon the context of the data. For example, if the context is relating to business-use and is presented on a computer screen that is accessing an Internet news service, the context-based filter unit 310 may eliminate various words to decipher the main content of the text. Therefore, if a long drawn out piece of formatted text contains a ticker symbol for IBM and the phrase "stock quote," along with an associated number, such as 91.50, the context-based filter may extract the words IBM, and 91.50 from the context of the text, because a stock quote was recognized in the context of business news. A person with vision impairment may quickly decipher the content of the text block and may then decide to further investigate this particular news based upon interest of the topic in the text block. Various other context-based algorithms may be supplied such that the data filter unit 220 may perform various context-based decisions to extract particular text from a block of data, such as music-related text, sports-related text, and the like.

The data filter unit 220 may also comprise a statistical-based filter unit 320 that may perform statistical elimination or extraction of words from a particular set of data. The statistical-based algorithm contained within the statistical-based filter unit 320 may include a predetermined concept of the most frequently occurring words, which may be used to either extract or decipher the main content of the data based upon such frequency. This filtering may also relate to other types of filtering, such as context-based filtering, where the context-based filter unit 310 may provide an indication to the statistical-based filter unit 320 that a particular type of word may be eliminated because it appears at approximately a predetermined frequency. The statistical-based filter unit 320 may skip certain portions of the text block based upon the redundancy of various words. Various algorithms may be programmed into the statistical-based filter unit 320 to perform various statistical-based filtering.

The data filter unit 220 may also comprise a semantic-based filter unit 330, which may decipher semantics from various words in the block of data being scanned, and decipher the content of the data based upon the semantics. For example, certain meanings of particular words may be analyzed based upon the domain or the context of the data, and explicitly remove some of the words based upon the semantics of various words. Therefore, many words can be filtered out from a block of text based upon the semantics. One example may be to include domain specific content that generally occurs pervasively and to reduce outlier words that are deemed to be out of the domain. The co-occurrences of the words that are relevant to the domain may be modeled. Again, the semantics-based filter unit 330 may work in conjunction with other filters within the data filter unit 220.

The data filter unit 220 may also comprise a rule-based filter unit 340. The rule-based filter unit 340 may comprise various algorithms that may be implemented to eliminate or filter out various portions of the input data. For example, using rule-based filtering, various words or sentences, within a block of text may be extracted or eliminated based upon a particular rule being applied. For example, the rule-based filter unit 340 may be pre-programmed to filter out the words "of," "the," etc., which may be skipped within a block of text and it would still be possible to decipher the main point of the content of the input data. Various rules may be set, such that certain prepositions and/or articles may be filtered out based upon the program rules in order to generate an abbreviated version of the recognized data. Other filters may be employed together or separately with the various filters described in the data filter unit 220. Upon the utilization of these filters, filtered data 333 is provided to the output signal/data generator 240 for preparation to send out as output data. Various elements of the data filter unit 220, such as the context-based filter unit 310, the statistical-based filter unit 320, the semantic-based filter unit 330, and/or the rule-based filter unit 340, may be software, hardware, or firmware unit(s) that are standalone units or may be integrated into a computer system associated with the scanning device 150. The operations of the data filter unit 220 (e.g., how much filtering to perform, i.e., whether to tighten or relax the constraints relating to the various filters) may be controlled by the controller 230 using one or more control parameters.

Figure 4:
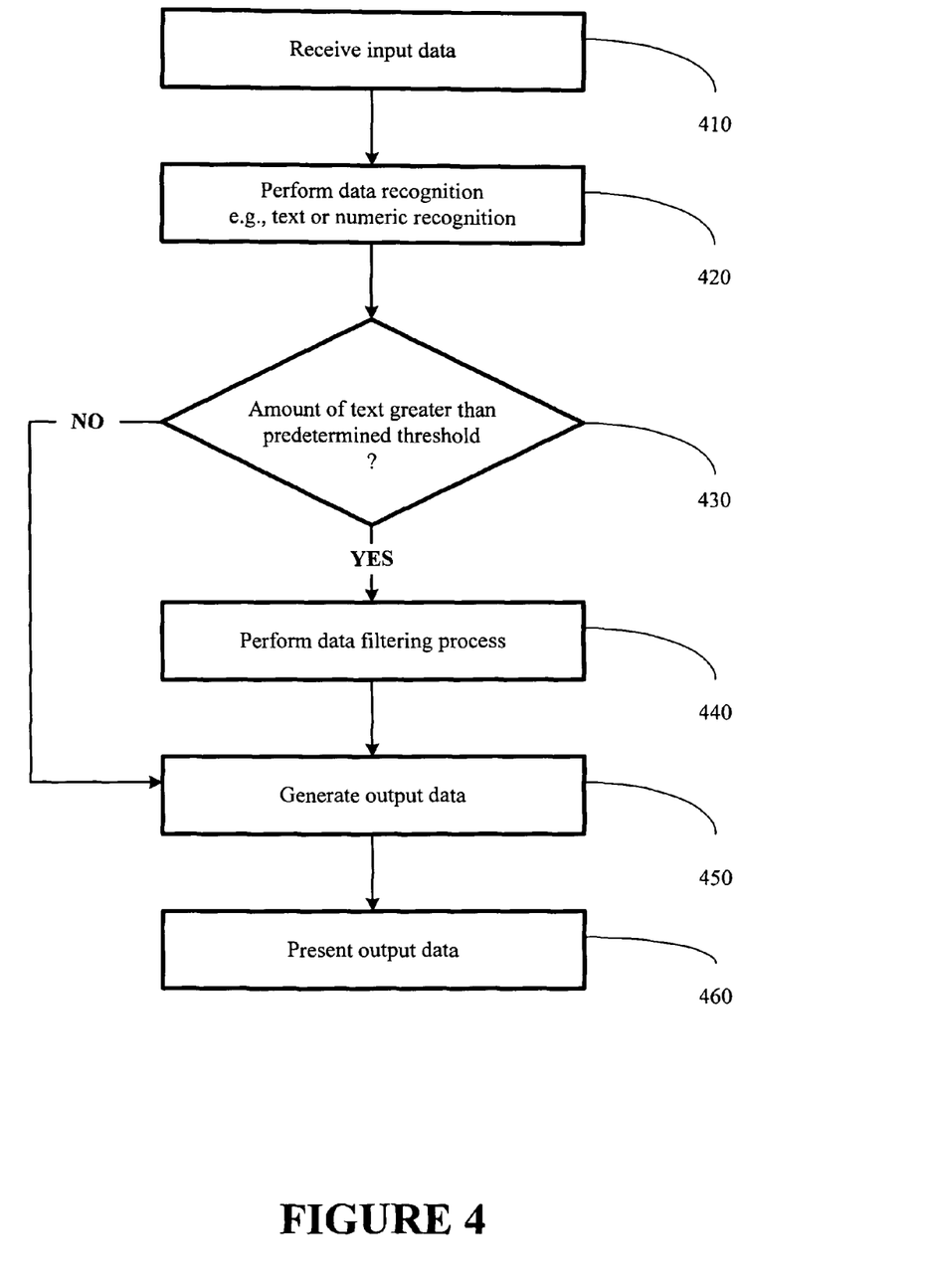
FIG. 4 illustrates a flowchart depicting a method in accordance with one illustrative embodiment of the present invention.

Turning now to FIG. 4, a flow chart depiction of the methods in accordance with embodiments of the present invention is illustrated. The scanning device 150 may receive input data for scanning purposes (block 410). The received input data may comprise data from various types of media, such as computer systems, newspapers, books, and the like (as shown in FIG. 1). The scanning device 150 may capture data from a newspaper 125 or a computer screen 110 and convert it to audio display for a person of vision impairment. Generally, this person may desire an abbreviated version of the text in order to determine whether there is enough interest in examining the entire text. Likewise, a person performing research may capture data from a variety of sources, such as a book 130 or a computer system 110. In order to perform the research more efficiently, the researcher may desire an abbreviated version of the captured text in order to determine whether a closer examination of the captured text would be beneficial for the research.

Upon receiving the input data, the scanning device 150 may perform a data recognition function (block 420). A data recognition function may comprise text recognition, numeric recognition, and the like. Upon recognition of the data, the scanning device 150 may determine whether the amount of text is greater than a predetermined threshold (block 430). In other words, the scanning device 150 may examine and/or analyze a block of data, such a block of text, and determine whether the number of words within that block is greater than a predetermined threshold. If a determination is made that it is not greater than the predetermined threshold, an output will be generated from the data and then the output data will be presented (blocks 450, 460). For example, if a person with vision impairment is reviewing the content of a computer screen, the scanner 150 may determine that the particular block of text being examined is sufficiently small to display the entire amount of text.

When the scanning device 150 determines that the amount of data or text within the block of data being examined is greater than a predetermined threshold, the scanning device 150 may perform the data filtering process to reduce or create an abbreviated version of the data that was scanned and deciphered (block 440). In other words, the captured data is large enough that it would be more efficient to decipher a synopsis of the captured data to determine if further interest exists to examine the larger portion of the data. In such cases, it would generally be more efficient to perform a filtering process to formulate an intelligent synopsis of the larger data portion. This function may include an analysis of the text for information content and a pruning or filtering process if the amount of text is greater than the predetermined threshold. A more detailed description of performing the data filtering process indicated in block 440 of FIG. 4 is provided in FIG. 5 and accompanying description below.

Upon performing the data filtering process, a more abbreviated portion of the data with a meaningful indication of the content of the larger portion of the data is used to generate output data (block 450). This output data may take on various formats, such as audio data, video data, and the like. Upon generation of the output data, the scanning device 150 may then present the output data in its respective format, such as audio or video formats for display. For example, the abbreviated version of the data may be played by the audio device 170. A person with vision impairment may then listen to the audio to determine if sufficient interest is present to listen to the entire device.

Figure 5:
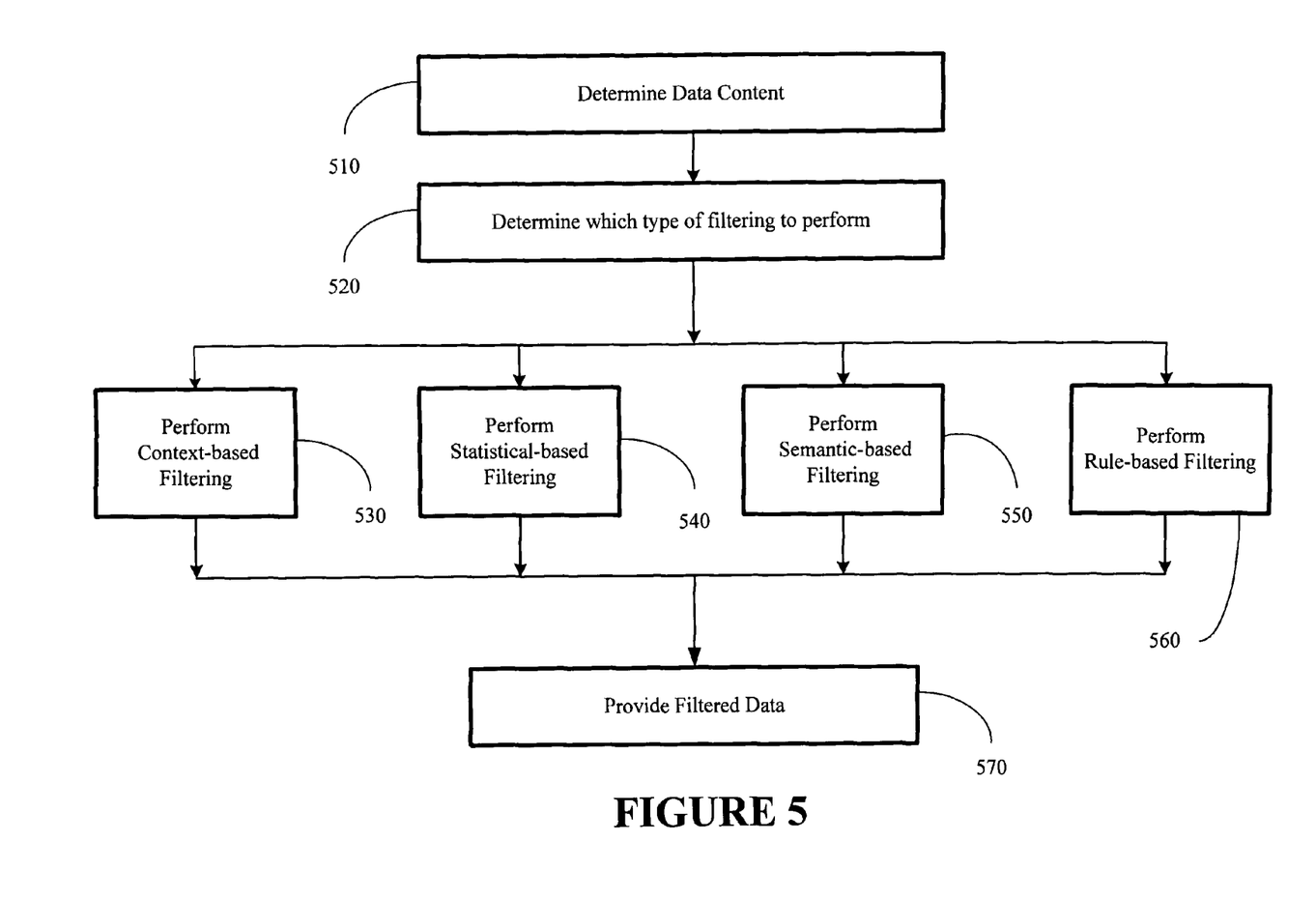
FIG. 5 illustrates a more detailed flowchart of a method of performing a data filtering process indicated in FIG. 4, in accordance with one illustrative embodiment of the present invention.

Turning now to FIG. 5, a more detailed flowchart depiction of the methods and steps associated with the data filtering process described in block 440 of FIG. 4 is illustrated. The scanning device 150 may determine the data content based on the data recognition described above (block 510). Upon determining the content of the data, the scanning device 150 may determine which type of filtering to perform (block 520). The system 100 may determine that more than one type of filtering is to be performed by the data filtering process. The scanning device 150 may perform the context-based and the statistical-based filtering. In an alternative embodiment, the scanning device may perform all of the available filtering.

The scanning device 150 may then perform a context-based filtering, which calls for examining the context of the recognized data and performing the filtration process based upon the context (block 530). For example, if the context relates to sports, and names of particular teams are recognized next to various numbers, a filtering process may extract the names of the teams and related scores during the filtering process. The scanning device 150 may also perform a statistical-based filtering, which may call for executing an algorithm that examines a frequency of particular words (block 540). The decision to examine the frequency of particular words may be based on other factors, such as the context of the data being scanned. Additionally, the scanning device 150 may perform a semantic-based filtering, which examines the semantics of various words in a text block and performs extraction of many words based upon the semantics and/or other factors, such as the context (block 550). The scanning device 150 may also perform a rule-based filtering, which may execute various rule-based algorithms for the elimination of particular words, such as grammatical rules, such as elimination of various prepositions or articles, and the like (block 560). Upon execution of one or more types of filtering described above, filtered data is provided (block 570). Below is an example of the scanning and filtering of a particular text block and the result from such scanning that may be provided by implementing embodiments of the present invention. Other types of filtrations are made possible and may be more or less effective, yet remain within the scope and spirit of the present invention.

A sample block of text that may be filtered by the scanning device 150 is provided below.

> Imagine yourself in an old muscle car—a '67 Mustang for argument's sake—cruising down a strip of old Route 66 barreling toward L.A. It's night time. Your lights are out. Your eyes are closed. Useless. That's how Wendy Miller, a 41-year-old who has been completely blind since the age of eight, described the information superhighway. Useless. That is, until a blind friend tuned her in, turned her in and told her how to download a copy of Lynx, a text-only browser that ignores graphics and colors but lists hyperlinks as a series of numerical choices. The text is then piped through a voice synthesizer and, sure enough, the blind are cruising down the superhighway.

Using the filtering process provided by embodiments of the present invention the above paragraph may be filtered into the flowing abbreviated text below.

> Imagine yourself old muscle car—'67 Mustang argument's sake—cruising down strip old Route 66 barreling toward L.A. lights eyes That's how Wendy Miller 41-year-old who has been completely blind since age eight described information superhighway. until blind friend tuned her turned her on told her how download copy Lynx text-only browser ignores graphics colors but lists hyperlinks as series numerical choices. text then piped through voice synthesizer sure enough blind are cruising down superhighway.

The above abbreviated paragraph has only the words selected that maximize the information content in the sentence, but is pruned by about 34% (117 words pruned to 77 words). Document summarization and filtering techniques utilized by embodiments of the present invention may also be incorporated into various existing scanning software, hardware, or firmware applications, such as Latent Semantic Analysis (LSA) or other text summarization techniques, such as word clustering applications, word-level IR applications, topic spotting applications, and/or lexical chain applications, etc.

Utilizing embodiments of the present invention, a more efficient, and accurate scanning of data, such as text data, may be performed. A scanning function may be performed on a block of text and a brief synopsis that includes an intelligent filtration process may be provided, such that a person may decide to examine the data further.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
receiving a control parameter relating to a level of detail associated with filtering a first portion of data;
performing said filtering, at a processor utilizing device, of said first portion of data based upon said control parameter, said filtering of said first portion of data comprises a semantic-based filtering and at least one of a rule-based filtering, a statistical-based filtering, and a context-based filtering to perform a reduction of at least a portion of said first portion of data, wherein said control parameter relates to the semantic-based filtering and at least one of the rule-based filtering, the statistical-based filtering, and the context-based filtering; and
providing a second portion of data that is smaller than said first portion of data based upon said filtering of said first portion of data, wherein said semantic-based filtering and at least one of said rule based filtering, statistical based filtering, and said context-based filtering each include at least one filter constraint related to an adjustable level of detail, and wherein said filter constraint is controlled at least partially by said control parameter.

2. The method of claim 1, wherein filtering said first portion of data further comprises filtering a first portion of text.

3. The method of claim 2, wherein filtering a first portion of text further comprises summarizing a main content of said first portion of text.

4. The method of claim 2, further comprising scanning said first portion of text to perform said filtering.

5. The method of claim 4, wherein scanning said first portion of text further comprises scanning said first portion of text from at least one of a computer system, a cellular or wireless phone, a text document, a newspaper, a book, a personal communication device, and a personal data assistant (PDA).

6. The method of claim 1, further comprising providing said second portion of data for presentation by at least one of an audio device, a video device, and a computing device.

7. The method of claim 1, wherein filtering of said first portion of data based upon said context-based filtering further comprising filtering a portion of said first portion of data based upon said context of said first portion of data.

8. The method of claim 1, wherein filtering of said first portion of data based upon said statistical-based filtering further comprising performing the reduction of data based upon a frequency of occurrence of a portion of said first portion of data.

9. The method of claim 1, wherein filtering of said first portion of data based upon said semantic-based filtering further comprising eliminating a portion of said first portion of data based upon a semantic of a content of said first portion of data.

10. The method of claim 1, wherein filtering of said first portion of data based upon said rule-based filtering further comprising eliminating a portion of said first portion of data based upon a predetermined rule.

11. The method of claim 10, wherein eliminating a portion of said first portion of data based upon a predetermined rule further comprises eliminating all prepositions from said first portion of said data.

12. A method, comprising:
receiving a first portion of text by performing a scanning function;
performing a filtering, at a processor-based device, of said first portion of text, said filtering of said first portion of text comprises a semantic-based filtering and at least one of a rule-based filtering, a statistical-based filtering, and a context-based filtering to perform a reduction of at least a portion of said first portion of text; and
providing a second portion of text that is smaller than said first portion of text based upon said filtering of said first portion of text, wherein said semantic-based filtering and at least one of said rule based filtering, statistical based filtering, and said context-based filtering each include at least one filter constraint related to an adjustable level of detail, and wherein said at least one filter constraint is controlled at least by a received control parameter that is related to a level of detail associated with filtering the first portion of text.

13. The method of claim 12, wherein performing said scanning function of said first portion of text further comprises scanning said first portion of text from at least one of a computer system, a cellular or wireless phone, a text document, a newspaper, a book, a personal communication device, and a personal data assistant (PDA).

14. The method of claim 12, further comprising providing said second portion of text for presentation by at least one of an audio device, a video device, and a computing device.

15. An apparatus, comprising:
means for receiving a first portion of text by performing a scanning function;
means for performing a filtering of said first portion of text, said filtering of said first portion of text comprises a semantic-based filtering and at least one of a rule-based filtering, a statistical-based filtering, and a context-based filtering to perform a reduction of at least a portion of said first portion of text; and
means for providing a second portion of text that is smaller than said first portion of text based upon said filtering of said first portion of text, wherein said semantic-based filtering and at least one of said rule based filtering, statistical based filtering, and said context-based filtering each include at least one filter constraint related to an adjustable level of detail, and wherein said filter constraint is controlled at least by a received control parameter that is related to a level of detail associated with filtering the first portion of text.

16. A system, comprising:
a data source apparatus for providing text;
a scanning device apparatus to scan said text and perform a filtering function upon said scanned text, said filtering function comprises performing a semantic-based filtering and at least one of a rule-based filtering, a statistical-based filtering, and a context-based filtering to perform a reduction of at least a first portion of said text to produce a second portion of text that is smaller than said first portion; and
a data output source to present said second portion of text, wherein said semantic-based filtering and at least one of said rule based filtering, statistical based filtering, and said context-based filtering each include at least one filter constraint related to an adjustable level of detail, and wherein said filter constraint is controlled at least by a received control parameter that is related to a level of detail associated with filtering the first portion of text.

17. The system of claim 16, wherein said data source is at least one of a computer system, a cellular or wireless phone, a text document, a newspaper, a book, a personal communication device, and a personal data assistant (PDA).

18. The system of claim 17, wherein said scanning device to extract text from said computer system from a group of text and graphics.

19. The system of claim 16, wherein said scanning device comprises at least one of a software, hardware, and firmware device.

20. The system of claim 16, wherein said scanning device to filter a portion of said first portion of text based upon said context of said first portion of text.

21. The system of claim 16, wherein said scanning device to perform the reduction of text based upon a frequency of occurrence of a portion of said first portion of text.

22. The system of claim 16, wherein said scanning device to eliminate a portion of said first portion of data based upon a semantic of a content of said first portion of text.

23. The system of claim 16, wherein said scanning device to eliminate a portion of said first portion of data based upon a predetermined rule.

24. The system of claim 23, wherein said scanning device to eliminate all prepositions from said first portion of said data based upon said predetermined rule.

25. The system of claim 16, wherein said data output source is at least one of an audio device, a video device, and a computing device.

26. An apparatus, comprising:
a scanning device apparatus to scan a first portion of a text to provide a scanned text and to perform a filtering function upon said scanned text, said filtering function comprises performing a semantic-based filtering and at least one of a rule-based filtering, a statistical-based filtering, and a context-based filtering to perform a reduction of at least a portion of said first portion of text to produce a second portion of text that is smaller than said first portion of text, wherein said semantic-based filtering and at least one of said rule based filtering, statistical based filtering, and said context-based filtering each include at least one filter constraint related to an adjustable level of detail, and wherein said filter constraint is controlled at least by a received control parameter that is related to a level of detail associated with filtering the first portion of text.

27. The apparatus of claim 26, wherein said scanning device to extract text from said computer system from a group of text and graphics.

28. The apparatus of claim 26, wherein said scanning device comprises at least one of a software, hardware, and firmware device.

29. The apparatus of claim 26, wherein said scanning device to filter a portion of said first portion of text based upon said context of said first portion of text.

30. The apparatus of claim 26, wherein said scanning device to perform the reduction of text based upon a frequency of occurrence of a portion of said first portion of text.

31. The apparatus of claim 26, wherein said scanning device to eliminate a portion of said first portion of data based upon a semantic of a content of said first portion of text.

32. The apparatus of claim 26, wherein said scanning device to eliminate a portion of said first portion of data based upon a predetermined rule.

33. The apparatus of claim 32, wherein said scanning device to eliminate all prepositions from said first portion of said data based upon said predetermined rule.

34. The apparatus of claim 32, wherein said scanning device being adapted to be controlled by voice activation.

35. A computer readable program storage device encoded with instructions that, when executed by a computer, performs a method, comprising:
receiving a control parameter relating to a level of detail associated with filtering a first portion of data;
performing said filtering of said first portion of data based upon said control parameter, said filtering of said first portion of data comprises a semantic-based filtering and at least one of a rule-based filtering, a statistical-based filtering, and a context-based filtering to perform a reduction of at least a portion of said first portion of data, wherein said control parameter relates to the semantic-based filtering and at least one of the rule-based filtering, the statistical-based filtering, and the context-based filtering; and
providing a second portion of data that is smaller than said first portion of data based upon said filtering of said first portion of data, wherein said semantic-based filtering and at least one of said rule based filtering, statistical based filtering, and said context-based filtering each include at least one filter constraint related to an adjustable level of detail, and wherein said filter constraint is controlled at least partially by said control parameter.

36. The computer readable program storage device encoded with instructions that, when executed by a computer, performs the method of claim 35, wherein filtering said first portion of data further comprises filtering a first portion of text.

37. The computer readable program storage device encoded with instructions that, when executed by a computer, performs the method of claim 36, wherein filtering a first portion of text further comprises summarizing a main content of said first portion of text.

38. The computer readable program storage device encoded with instructions that, when executed by a computer, performs the method of claim 36, further comprising scanning said first portion of text to perform said filtering.

39. The computer readable program storage device encoded with instructions that, when executed by a computer, performs the method of claim 38, wherein scanning said first portion of text further comprises scanning said first portion of text from at least one of a computer system, a cellular or wireless phone, a text document, a newspaper, a book, a personal communication device, and a personal data assistant (PDA).

40. The computer readable program storage device encoded with instructions that, when executed by a computer, performs the method of claim 35, further comprising providing said second portion of data for presentation by at least one of an audio device, a video device, and a computing device.

41. The computer readable program storage device encoded with instructions that, when executed by a computer, performs the method of claim 35, wherein filtering of said first portion of data based upon said context-based filtering further comprising filtering a portion of said first portion of data based upon said context of said first portion of data.

42. The computer readable program storage device encoded with instructions that, when executed by a computer, performs the method of claim 35, wherein filtering of said first portion of data based upon said statistical-based filtering further comprising performing the reduction of data based upon a frequency of occurrence of a portion of said first portion of data.

43. The computer readable program storage device encoded with instructions that, when executed by a computer, performs the method of claim 35, wherein filtering of said first portion of data based upon said semantic-based filtering further comprising eliminating a portion of said first portion of data based upon a semantic of a content of said first portion of data.

44. The computer readable program storage device encoded with instructions that, when executed by a computer, performs the method of claim 35, wherein filtering of said first portion of data based upon said rule-based filtering further comprising eliminating a portion of said first portion of data based upon a predetermined rule.

45. The computer readable program storage device encoded with instructions that, when executed by a computer, performs the method of claim 44, wherein eliminating a portion of said first portion of data based upon a predetermined rule further comprises eliminating all prepositions from said first portion of said data.

46. A method, comprising:
generating, at a processing device, a filtered portion of data that is smaller than a non-filtered portion of data based upon filtering said non-filtered portion of data based upon performing a semantic-based filtering and at least one of a rule-based filtering, a statistical-based filtering, and a context based filtering to perform a reduction of at least a portion of said non-filtered portion of data based upon a control parameter indicative of a predetermined level of detail associated with said filtering said non-filtered portion of data, the control parameter relating to the semantic-based filtering and at least one of the rule-based filtering, the statistical-based filtering, and the context based filtering, wherein said semantic-based filtering and at least one of said rule-based filtering, statistical-based filtering, and said context based filtering each include at least one filter constraint related to an adjustable level of detail, and wherein said filter constraint is controlled at least partially by said control parameter.

47. A method, comprising:
performing, at a processing device, filtering of a portion of data for generating a smaller filtered portion of data, said filtering of said portion of data comprises a semantic-based filtering and at least one of a rule-based filtering, a statistical-based filtering, and a context based filtering to perform a reduction of at least a portion of said portion of data, said filtering of said portion of data based upon a control parameter indicative of a predetermined level of detail associated with said filtering of said portion of data, the control parameter relating to the semantic-based filtering and at least one of the rule-based filtering, the statistical-based filtering, and the context based filtering, wherein said semantic-based filtering and at least one of said rule-based filtering, statistical-based filtering, and said context based filtering each include at least one filter constraint related to an adjustable level of detail, and wherein said filter constraint is controlled at least partially by said control parameter.

48. An apparatus, comprising:
a scanning device apparatus to scan data and to perform a filtering function upon said scanned data, said scanning device to perform semantic-based filtering and at least one of a rule-based filtering, a statistical-based filtering, and a context-based filtering to perform a reduction of at least a portion of said scanned data to produce a portion of text that is smaller than said scanned portion, wherein said semantic-based filtering and at least one of said rule-based filtering, statistical-based filtering, and said context based filtering each include at least one filter constraint related to an adjustable level of detail, and wherein said filter constraint is controlled at least partially by a received control parameter that is related to a level of detail associated with filtering said scanned data.

49. A method, comprising:
receiving a first portion of text by performing a scanning function;
performing a filtering, at a processor-based device, of said first portion of text, said filtering of said first portion of text comprises a semantic-based filtering and at least one of a rule-based filtering, a statistical-based filtering, and a context-based filtering to perform a reduction of at least a portion of said first portion of text, wherein relevant semantics to be used in the semantic-based filtering comprise information related to domain specific content; and
providing a second portion of text that is smaller than said first portion of text based upon said filtering of said first portion of text, wherein said semantic-based filtering and at least one of said rule based filtering, statistical based filtering, and said context-based filtering each include at least one filter constraint related to an adjustable level of detail, and wherein said filter constraint is controlled at least by a received control parameter that is related to a level of detail associated with filtering the first portion of text.

50. A method, comprising:
receiving a first portion of text by performing a scanning function;
performing a filtering, at a processor-based device, of said first portion of text, said filtering of said first portion of text comprises a semantic-based filtering and at least one of a rule-based filtering, a statistical-based filtering, and a context-based filtering to perform a reduction of at least a portion of said first portion of text, wherein the type of filtering to be used is determined based upon at least the content of the data to be filtered; and
providing a second portion of text that is smaller than said first portion of text based upon said filtering of said first portion of text, wherein said semantic-based filtering and at least one of said rule based filtering, statistical based filtering, and said context-based filtering each include at least one filter constraint related to an adjustable level of detail, and wherein said filter constraint is controlled at least by a received control parameter that is related to a level of detail associated with filtering the first portion of text.

* * * * *